United States Patent
Pham et al.

[19]

[11] Patent Number: 5,917,672
[45] Date of Patent: Jun. 29, 1999

[54] DISK FILE HEAD POSITIONING SERVO SYSTEM INCORPORATING ADAPTIVE SATURATED SEEK AND HEAD OFFSET COMPENSATION

[75] Inventors: Ich Van Pham, San Jose; Mark Andrew Pajdowski, Los Gatos, both of Calif.

[73] Assignee: Seagate Technology, Inc.

[21] Appl. No.: 08/898,549

[22] Filed: Jul. 22, 1997

Related U.S. Application Data

[62] Division of application No. 08/606,641, Feb. 27, 1996, which is a continuation of application No. 08/182,611, Jan. 14, 1994, abandoned.

[51] Int. Cl.$^6$ ........................................................ G11B 5/55
[52] U.S. Cl. ..................... 360/78.09; 360/78.04
[58] Field of Search .............................. 360/77.04, 77.05, 360/78.04, 78.06, 78.09, 78.07, 78.14, 75; 318/561

[56] References Cited

U.S. PATENT DOCUMENTS

| | | | |
|---|---|---|---|
| 4,914,644 | 4/1990 | Chen et al. ...................... | 360/78.09 X |
| 5,602,698 | 2/1997 | Kadlec ................................ | 360/78.04 |

*Primary Examiner*—Aristotelis M. Psitos
*Assistant Examiner*—James L Habermehl
*Attorney, Agent, or Firm*—Shawn B. Dempster; Edward P. Heller, III

[57] ABSTRACT

A data recording disk file includes rotatable disks with concentric data tracks thereon. The data disk file includes servo information recorded on at least one of the disks, at least one head for reading the servo information during rotation of the disk, and a voice coil motor (VCM) attached to the head for positioning the head relative to the data tracks. A servo is driven by signals read from the head to control the VCM. The servo includes a processor employing an estimator model for estimating the parameters of the VCM and for generating, from the estimated parameters and the servo information, a digital control signal. The digital control signal is converted to an analog control signal. The control signal is applied to a power amplifier which generates an input current for use by the VCM. The processor provides solely a single estimator model which operates in both saturated mode and linear mode depending on the magnitude of the digital PES. In the processor, a discrete model is formed by using a linear continuous model in which the effect of the back electromotive force (emf) is implicitly added into the model, and the current rise time in the VCM is ignored. The processor employs an adaptive estimator model which adjusts its calculations based on both calibrated overall servo gain and the VCM torque constant. The processor also employs a technique used during calibration to identify the average VCM torque constant. The processor employs a technique used during calibration to identify head offsets. The servo includes a short seek and head switch technique which adaptively adjusts the estimator position, the feed forward durations and magnitude based on the identified head offsets.

2 Claims, 7 Drawing Sheets

DISK FILE HEAD POSITIONING SERVO SYSTEM INCORPORATING ADAPTIVE SATURATED SEEK AND HEAD OFFSET COMPENSATION

This application is a division of application Ser. No. 08/606,641, filed Feb. 27, 1996, which is pending, which is a continuation of application Ser. No. 08/182,611 filed Jan. 14, 1994, now abandoned.

TECHNCAL FIELD

The present invention relates to disk drives and, more particularly, to small, high-capacity hard disk drives employing precise servo-positioning techniques to provide reduced access times.

BACKGROUND ART

In typical prior art disk drive servos, a microprocessor uses an estimator to predict position, velocity and bias force of an actuator. The actuator is typically a voice coil motor (VCM) driven by a power amplifier. This type of prediction is referred to as predicting the actuator dynamic. U.S. Pat. No. 4,697,127 (Stich et al.) discloses a seeking discrete estimator model which is formed by using a linear double integrator continuous model. In the servo of Stich et al., it is assumed that the actuator acceleration, which is related to the VCM current, is proportional to the input control signal. In order to ensure seek reliability, the power amplifier must match the estimator model and operate in the linear mode. This degrades the access time because the servo does not use all of the available power from the supply voltage.

U.S. Pat. No. 4,679,103 (Workman) discloses a disk drive servo that operates in the saturated mode. The acceleration is a function of the maximum drive voltage, and the VCM electrical characteristics when the power amplifier operates in the saturated mode. In order to operate in the saturated mode, the servo system measures the VCM current through an analog to digital (A/D) converter and uses it as the input to the estimator model. This increases the hardware cost which is the most important constraint in the current disk drive market.

U.S. Pat. No. 4,914,644 (Chen et al.) discloses a disk drive servo system that uses a saturated estimator model which includes the back electromotive force (emf) of the VCM and the coil current rise time. It uses the velocity error signal to determine whether to use the saturated or the linear model in the servo calculation. These two models are independently derived offline by first forming continuous models and then converting them into discrete models.

One of the disadvantages of the foregoing technique is that it is quite complex and therefore is not normally used in simple disk drive servos. Such servos use the simplified linear estimator model. Another disadvantage of the prior art saturated technique is that it is not suitable for adaptively compensating for the back emf as a function of the VCM torque constant because the torque constant appears in most of the discrete time model coefficients.

U.S. Pat. No. 4,697,127 (Stich et al.) and U.S. Pat. No. 4,835,633 (Edel et al.) disclose techniques which identify the overall servo gain and adaptively use it in the servo calculation. Overall servo gain is defined as a factor which relates to the actuator acceleration. This factor represents a total servo channel gain variation which includes the power amplifier gain, the actuator torque constant and the actuator inertia. For a servo system which uses Pulse Width Modulation (PWM) for the digital to analog (D/A) converter, the overall servo gain also includes the power supply variation.

The overall servo gain cannot be used to change the back emf calculation in the estimator model because the back emf is only a function of the torque constant.

DISCLOSURE OF INVENTION

In accordance with the present invention, there is provided a new servo design technique which implements a single estimator model for both saturated and linear modes. In this new servo design technique, the discrete model is formed by using the linear continuous model. The effect of the back emf is then implicitly added into the model. The effect of the coil current rise time is ignored because it is faster than the maximum allowable coil current slew rate. This slew rate parameter minimizes rapid change in acceleration which can excite mechanical resonances. It is important to minimize the excitation of mechanical resonances because such resonances cause excessive acoustic noise. One of the important requirements for a disk drive used in a so-called computer "notebook" is to have little or no acoustic noise.

The present invention includes a technique for identifying the average VCM torque constant and then adaptively using both the overall servo gain and the torque constant in the estimator to maximize the servo performance. During calibration, the microprocessor stores samples of the estimator velocities during the saturated portion of the long seek. The microprocessor then calculates the average VCM torque constant.

The present invention also includes a new technique which is used during calibration to identify the head offsets, and a short seek and head switch algorithm which adaptively adjusts the estimator position, the feed forward durations and magnitudes based on the identified head offsets.

Other features of the present invention are disclosed or apparent in the section entitled "BEST MODE FOR CARRYING OUT THE INVENTION."

BRIEF DESCRIPTION OF DRAWINGS

For a fuller understanding of the present invention, reference is made to the accompanying drawing taken in conjunction with the following detailed description of the Best Mode For Carrying Out The Invention. In the drawing.

Figure 1:
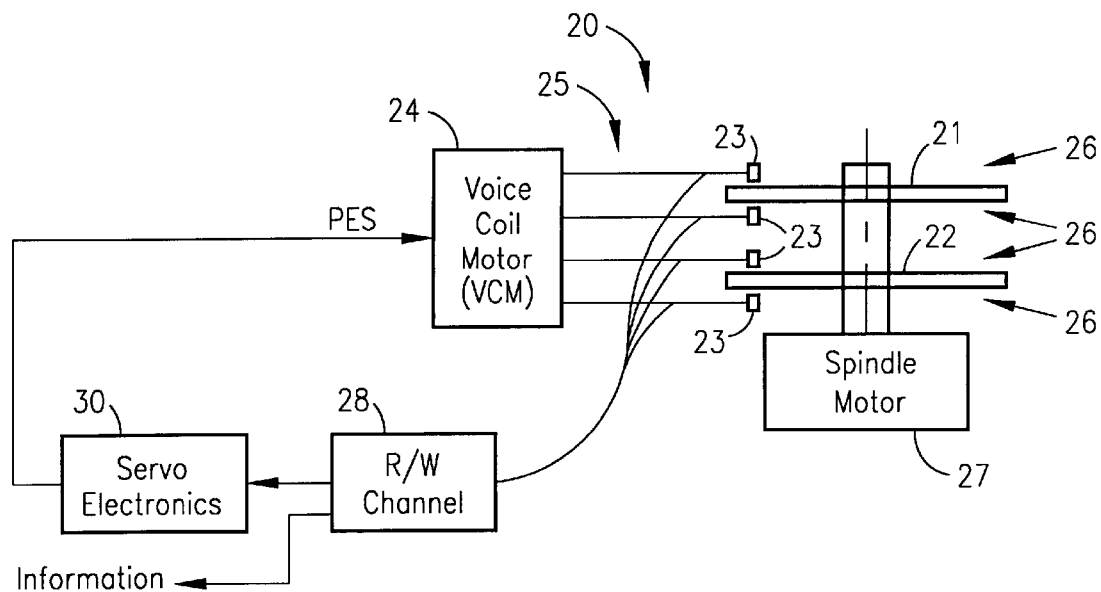
FIG. 1 is a simplified block diagram of a sector servo in accordance with the invention.

Reference numbers refer to the same or equivalent parts of the present invention throughout the several figures of the drawing.

BEST MODE FOR CARRYING OUT THE INVENTION

As hard disk drives, disk surfaces, servocontrol systems, VCM actuators, and read/write heads are all known in the art, in order to avoid confusion while enabling those skilled in the art to practice the claimed invention, this specification omits many details with respect to those items.

Referring now to FIG. 1, there is shown a simplified block diagram of a sector servo in accordance with the present invention. Disk files 20 are information storage devices which utilize one or more rotatable disks 21, 22 with concentric data tracks containing information, one or more heads 23 for reading or writing data onto the various tracks, and an actuator or voice coil motor (VCM) 24 connected by a support arm assembly 25 to the head or heads 23 for moving one of the heads 23 to the desired track and maintaining it over the track centerline during read or write operations. Each disk 21, 22 has two data surfaces 26, and the disks 21, 22, being disposed on a spindle, are driven by a spindle motor 27. The read/write information is electrically coupled to and from the heads 23 by way of a read/write (R/W) channel 28. The R/W channel 28 may include amplifiers, filters and detectors.

The movement of the head 23 to a desired track is referred to as track accessing or "seeking", while the maintaining of the head 23 over the centerline of the desired track during a read or write operation is referred to as track "following". The actuator or VCM 24 typically comprises a coil movable through the magnetic field of a permanent magnetic stator. The application of current to the VCM 24 causes the coil, and thus the attached head 23, to move radially. The acceleration of the coil is proportional to the applied current, so that ideally there is no current to the coil if the head 23 is perfectly stationary over a desired track.

In disk files 20 which have a relatively high density of data tracks on the disk 23, it is necessary to employ a servo control system to efficiently move the head 23 between tracks and to maintain the head 23 precisely over the centerline of the desired track during read or write operations. This is accomplished by utilizing prerecorded servo information either on a dedicated servo disk or on sectors angularly spaced and interspersed among the data on the data disks 21, 22. The prerecorded servo information is customarily written to the disks 21, 22 by a servowriter at the factory. The prerecorded servo information is read off the disks 21, 22 and is applied to the input of servo electronics 30 which drives the VCM 24.

Figure 2:
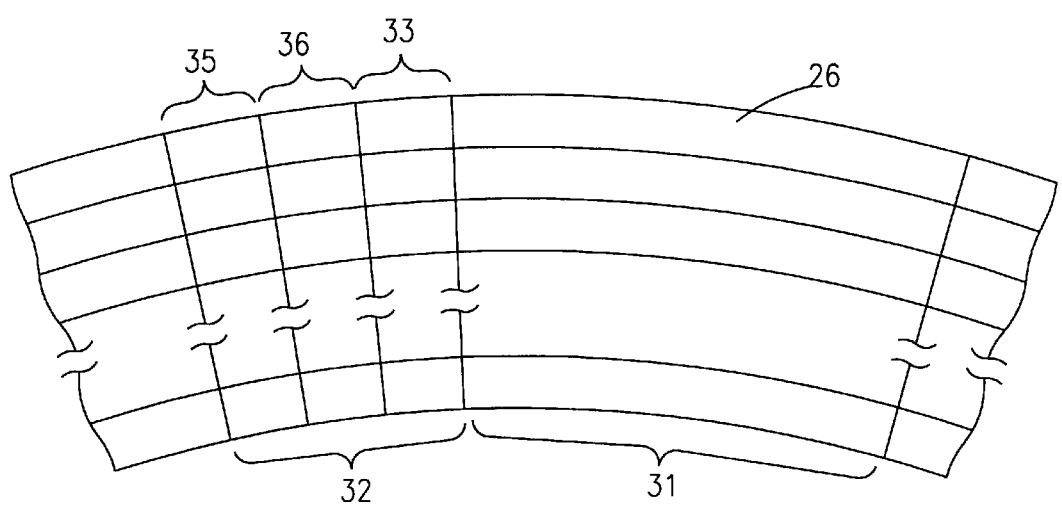
FIG. 2 is a broken, fragmentary view of the recording surface of a portion of a disk useful in a disk drive in accordance with the invention, and indicating a sector servo pattern thereon.

Referring now to FIG. 2, there is shown a broken, fragmentary view of the recording data surface 26 of a portion of a disk 21, 22 that may be used in the present invention. The recording data surface 26 has a sector servo pattern thereon. The present invention relates to a disk drive digital sector servo employing a pattern of servo information prerecorded on sectors interspersed among the data on data disks. The usable recording data surface 26 may be divided into a plurality of data storage sectors 31, and a plurality of servo information sectors 32. The servo information sectors 32 may be distributed around the disks 21, 22 between adjacent data storage sectors 31.

Figure 3:
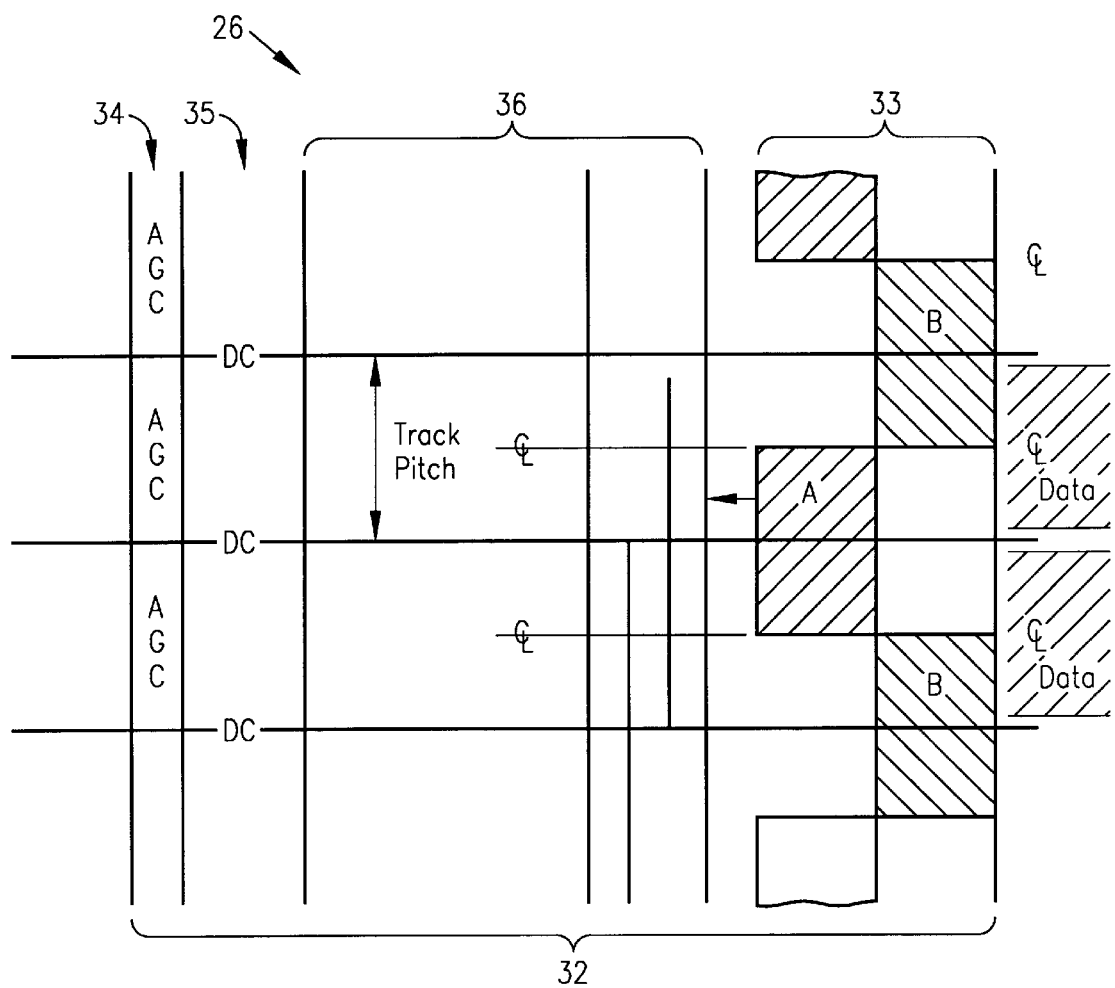
FIG. 3 is a schematic diagram illustrating the servo pattern provided in the servo information sector of a recording data surface.

Referring now to FIG. 3, there is shown a schematic diagram illustrating the servo pattern provided in the servo information sector 32 of a recording data surface 26. The servo pattern is composed of four sections: an automatic gain control (AGC) preamble 34; a Servo Sync Field 35; a Digital Gray Code 36; and a Position Error Signal (PES) A/B burst portion 33. The AGC preamble 34 provides a full amplitude signal coherently written across tracks for providing automatic gain control of the readback signal. The Servo Sync Field 35 provides a unique frequency which enables the digital processing electronics to synchronize to the information in the digital Gray Code 36. The Servo Sync Field 35 may be as simple as a DC erase gap, as indicated in FIG. 3. The digital Gray Code 36 includes digital encoding of such information as inner and outer guardband track regions, absolute cylinder number, and index and sector mark. The PES A/B burst portion 33 provides a linear PES voltage which is a measure of the offtrack position of the head reading that voltage.

Every servo sample provides information identifying the track, along with an analog component that identifies when the head 23 is to the left or to the right of track center. This analog component is derived from the constant frequency PES A/B burst portion 33. When the constant frequency bursts of servo patterns A and B are read as the disk revolves under the head, the head reads a portion of A and a portion of B. Signals A and B are demodulated and an amplitude comparison is made. The amplitude of A relative to the amplitude of B represents off-track positioning in either a positive or a negative direction. As the head moves across the tracks, the difference between the amplitude of the A burst and the amplitude of the B burst produces a difference signal called the PES. When the PES is zero, the head is on track center.

The Gray Code has encoded in it the address of the track. Upon arrival of the head on the track, verification is received that it is on the desired track. Once positioned on the track, the A-B burst information is used for track following. It will be seen that instead of continuous PES information being generated from the disk surface 26, position samples are obtained once every servo information sector 32.

While a specific servo signal format for a disk has been shown, it should be understood that other well known varieties of servo signal format may also be used, if desired.

Figure 4:
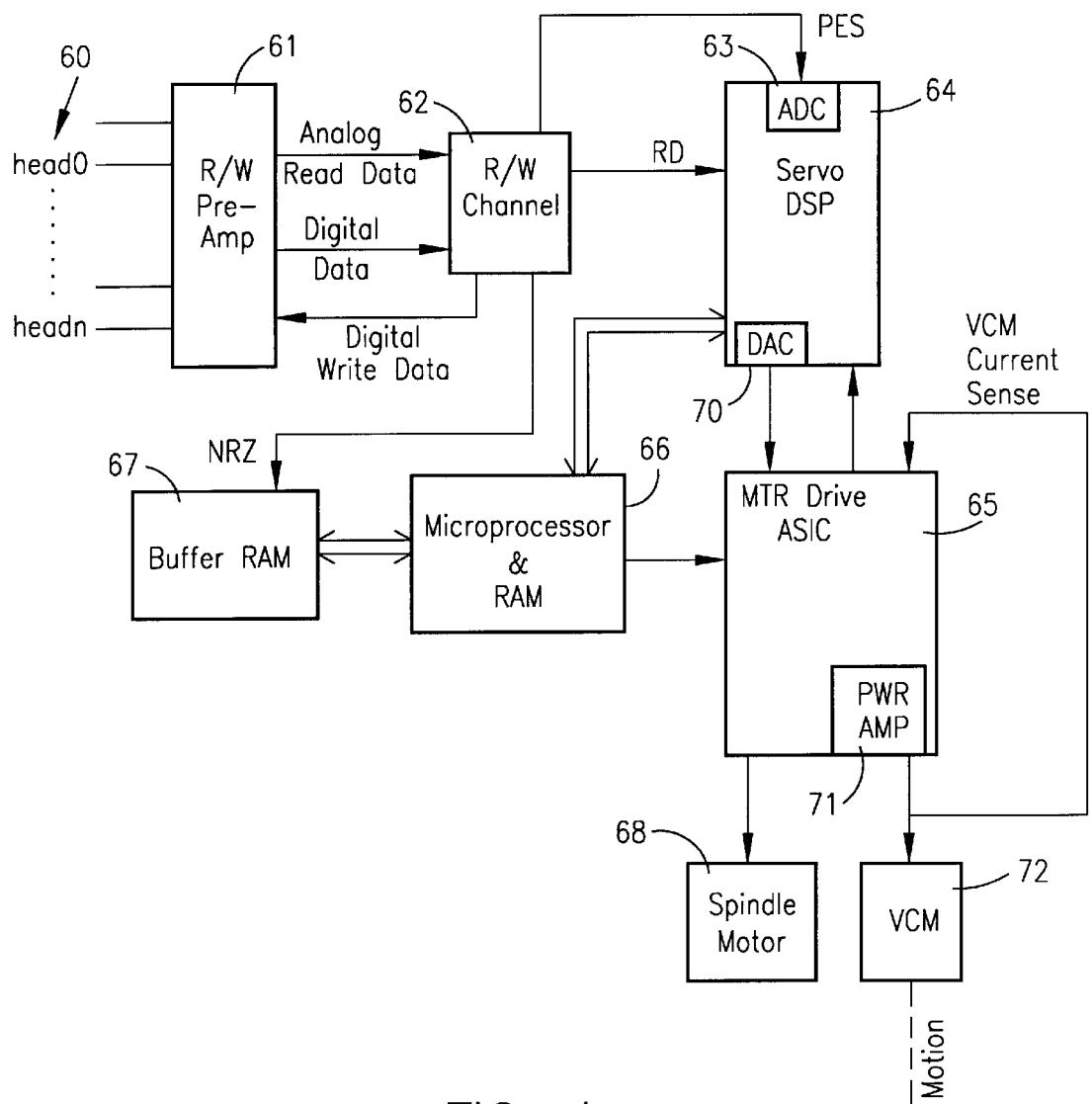
FIG. 4 is a schematic block diagram of a disk drive digital sector servo showing the best mode for carrying out the invention.

Referring now to FIG. 4, there is shown a functional block diagram of a digital sector servo embodying the best mode for carrying out the invention. A plurality of read/write (R/W) heads 60 are coupled by way of a read/write (R/W) preamplifier 61 to a read/write (R/W) channel 62. The R/W preamplifier 61 may be any conventional preamplifier such as the Model 2020 preamplifier made by SSI, and the R/W channel 62 may be an SSI Model 30P3523, for example.

As shown in FIG. 4, the R/W channel 62 also applies digital write data to the R/W preamplifier 61. The analog read data is processed in the R/W channel 62. The processing may involve filtering in a bandpass filter, detecting the amplitude of the A/B bursts, comparison of the amplitude of the A/B bursts, and the like. The analog read data is then applied to an analog to digital (A/D) converter 63 where the analog PES signal is changed to a digital PES signal, and is applied to a Servo Digital Signal Processor (DSP) 64. The A/D converter 63 and the Servo DSP 64 may be of a type manufactured by Texas Instruments, and the A/D converter 63 may be made integral with the Servo DSP 64, if desired.

Digital read data read from the disk by the R/W heads 60 is also coupled from the R/W preamplifier 61 and processed in the R/W channel 62. The digital read data, indicated as RD in FIG. 4, is applied to a different input of the Servo DSP 64. This digital read data includes the Servo Sync Field 35, and the Gray Code 36.

The digital control signal from the Servo DSP 64 is converted to an analog signal in an A/D converter 70. The A/D converter 70 may be made integral with the Servo DSP 64, if desired. The analog control signal is coupled from the A/D converter 70 to a motor drive Application Specific Integrated Circuit (ASIC) 65. The digital control signal is coupled to a microprocessor 66, which includes a Random Access Memory (RAM). The motor drive ASIC may be a Model PRD1029A ASIC manufactured by Siliconix, and the microprocessor 66 may be the Model 8054 processor manufactured by Intel.

The R/W channel 62 also applies digital Non-Return to Zero (NRZ) data to a buffer RAM 67. The buffer RAM 67 may be a Model M514258B RAM manufactured by OKI, and may include one or more computer interfaces, as needed. The microprocessor 66 is coupled to the buffer RAM 67. The motor drive ASIC 65 drives a spindle motor 68, which may be manufactured by Nidex. The analog servo control signal from the motor drive ASIC 65 is coupled to a power amplifier 71, which may be an integral part of the PRD1029A motor drive ASIC 65 manufactured by Siliconix. The power amplifier 71 drives a VCM 72 which controls the position of the R/W heads 60. In addition, a VCM current"sense" signal is fed back from the power amplifier 71 to the input of the motor drive ASIC 65.

In operation, the R/W heads 60 read the PES A/B burst portion 33 of the servo information sector 32 (see FIGS. 2 and 3), and produce an analog signal that goes through the R/W preamplifier 61 and the R/W channel 62. As noted above, the R/W channel 62 may include a filter, a demodulator and an amplitude comparison circuit. The bandpass filter is centered around the center frequency of the A/B burst. The demodulator demodulates the amplitude of the A/B burst, takes the difference between the A burst and the B burst to produce an analog PES signal. The analog PES signal is converted to a digital PES signal in the A/D converter 63, and the digital PES signal is applied to the Servo DSP 64.

The R/W heads 60 also generate a digital read signal. Included in that digital read signal is the Gray Code 36, that gives the track address as digital information, and the Servo Sync Field 35. The digital read signal is processed in the R/W preamplifier 61 and the R/W channel 62, and then applied to the digital read input of the Servo DSP 64.

Thus, the readback for the servo information is read and processed in two separate channels. The first channel is the PES channel that converts an analog PES signal to a digital PES signal and applies it to one input of the Servo DSP 64. The second channel is the digital channel that reads the digital Servo Sync Field 35, and reads the digital Gray Code 36, and applies the digital readout to the digital read input channel of the Servo DSP 64.

Digital data on the data sector 31 (FIG. 2) of the data surface 26 is read by the R/W heads 60, processed by the R/W preamplifier 61 and the R/W channel 62 and applied as an NRZ signal to the buffer RAM 67. The microprocessor 66 contains the software code that controls the operation of the servo. The motor drive ASIC 65 applies an analog control signal to the power amplifier 71, which in turn drives the VCM 72 to move the R/W heads 60 to a location that brings the PES to zero.

The Adaptive Saturated Seek

Figure 5:
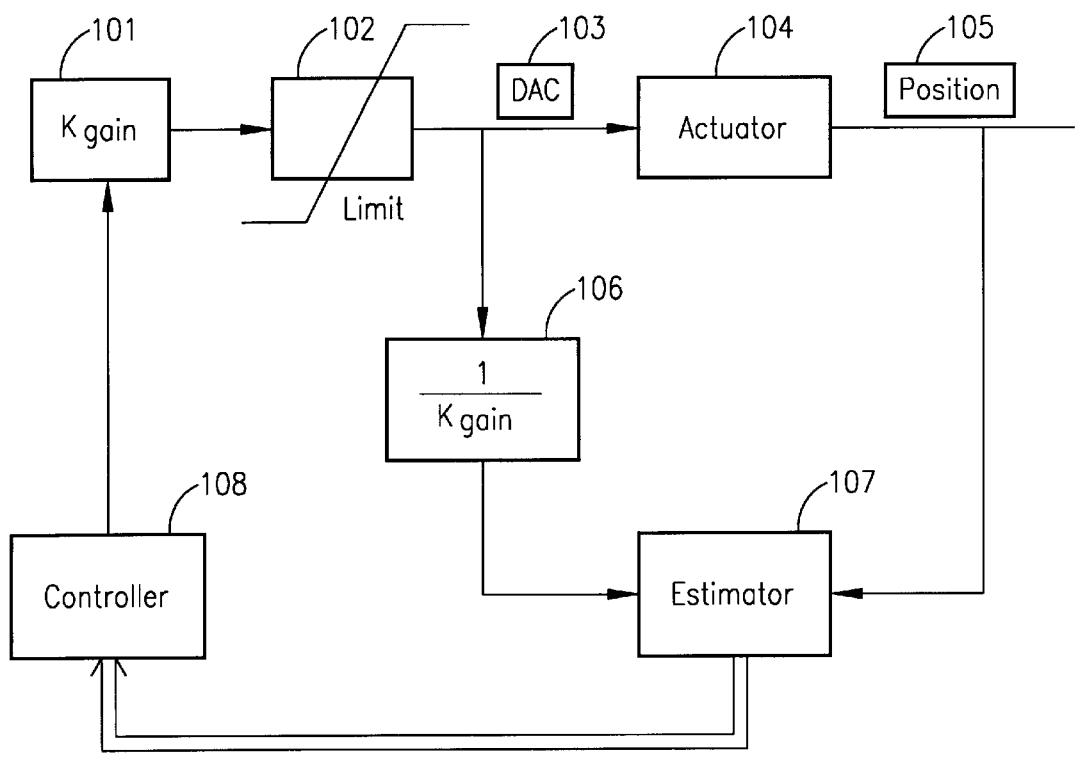
FIG. 5 is a schematic block diagram of the disk drive digital sector servo of FIG. 4 illustrating functionally the operation of the digital sector servo.

Referring now to FIG. 5, there is shown a simplified schematic block diagram illustrating a saturated seeking servo including an estimator model for the disk file head positioning servo system in accordance with the present invention. Block 101 represents the overall servo gain, $ky_{gain}$. Block 102 represents a limiter that limits the control signal to the maximum allowable supply voltage. Block 103 indicates that the control signal has passed through a digital to analog converter and is an analog control signal as it is applied to the input of block 104, an actuator. Block 105 indicates that the actuator 104 changes the physical position of the heads. Block 106 indicates that the overall servo gain normalizes the control signal and then applies it to the estimator model 107. The output of the estimator model 107 provides estimator equations in a controller 108. The controller 108 is coupled to block 101, the overall servo gain.

In typical prior art disk drive digital sector servos, an estimator is used to predict position, velocity and bias force of an actuator, which is typically a voice coil motor (VCM). This type of prediction is referred to as predicting the actuator dynamic. As was pointed out in the background section, some prior art digital sector servos have operated in the saturated mode. One disadvantage of the prior art techniques employing the saturated mode is that some are quite complex. Another disadvantage of the prior art saturated technique is that it is not suitable for adaptively compensating for the back emf as a function of the VCM torque constant. This is because when it is mathematically modeled, the torque constant appears in most of the discrete time model coefficients.

The present invention provides a new servo design technique which implements a single estimator model for both saturated and linear modes. In this new servo design technique, the discrete model is formed by using the linear continuous model. The effect of the back emf is then implicitly added into the model. The effect of the coil current rise time is ignored because it is faster than the maximum allowable coil current slew rate. This slew rate parameter minimizes rapid change in acceleration which can excite mechanical resonances.

U.S. Pat. No. 4,697,127 (Stich et al.) and U.S. Pat. No. 4,835,633 (Edel et al.) disclose techniques which identify the overall servo gain and adaptively use it in the servo calculation. Overall servo gain is defined as a factor which relates to the actuator acceleration. This factor represents a total servo channel gain variation which includes the power amplifier gain, the torque constant and the actuator inertia. For a servo system which uses Pulse Width Modulation (PWM) for the digital to analog (D/A) converter, the overall servo gain also includes the power supply variation. The overall servo gain can not be used to change the back emf calculation in the estimator model because the back emf is only a function of the torque constant.

In accordance with the present invention, there is provided a technique which identifies the torque constant and then adaptively uses both the overall servo gain and the torque constant in the estimator to maximize the servo performance. The following equations will be used in connection with the description given below.

$$e(k) = x_{1\ meas} - \bar{x}_1(k) \tag{1}$$

$$u(k) = k_{gain}(u_{pre-cal} + k_{pes}e(k)) \tag{2}$$

-continued $$\overline{X}(k+1) = \phi \hat{X}(k) + \frac{\Gamma_1 u_{dac}(k-1)}{k_{gain}} + \frac{\Gamma_2 u_{dac}(k)}{k_{gain}} + L_p e(k) + \text{Switch}_{linear} K_{bemf} \hat{x}_2(k) \quad (3)$$

$$u_{pre\_cal} = k_2(f(x_{1\ target} - \overline{x}_1(k+1) - \overline{x}_2(k+1)) - k_3 \overline{x}_3(k+1) \quad (4)$$

where:

e=estimator error.

$X_{1\ meas}$=measure position signal.

$k_{pes}$=estimator controller feedback gain.

$k_{gain}$=percentage of gain variation from the nominal.

u=control signal u.

$u_{per\_cal}$=part of the control signal u.

$u_{dac}$=limited control signal.

$\hat{X}$=3×1 vector which is estimated position $x_1$, velocity $x_2$ and bias $x_3$.

$\overline{X}$=3×1 vector which is predicted position $x_1$, velocity $x_2$ and bias $x_3$.

$\phi, \Gamma_1, \Gamma_2$ =ZOH model which is 3×3, 3×1 and 3×1 matrices respecively.

$L_p$=estimator gain, 3×1 vector $K_{bemf}$=back emf gain, 3×1 vector $k_2$=velocity feedback gain $k_3$=bias feedback gain f(.)=velocity trajectory $$\text{Switch}_{linear} = \begin{cases} 1 & \text{when } u_{dac} \approx \text{saturated value} \\ 0 & \text{otherwise} \end{cases} \quad (5)$$

Figure 6:
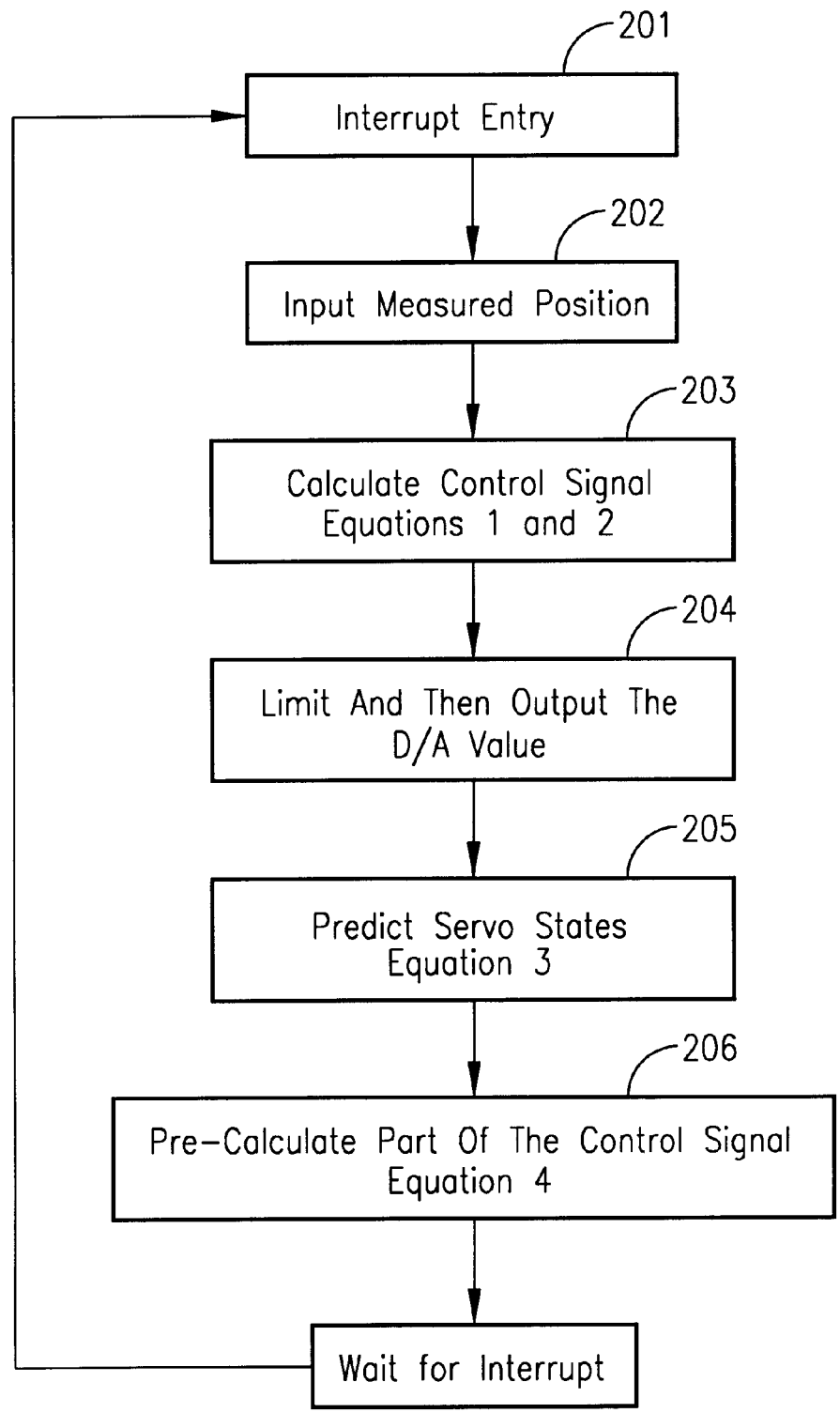
FIG. 6 is a flow chart diagram for a disk file head positioning servo system in accordance with the present invention, and illustrating an adaptive saturated seek technique.

Referring now to FIG. 6, there is shown a flow chart diagram for a disk file head positioning servo system in accordance with the present invention, and illustrating an adaptive saturated seek technique. As indicated in the saturated servo flow chart of FIG. 6, it operates under interrupt control. The servo sampling time is defined as the time interval between interrupts.

Block 201 at the top of FIG. 6 indicates an interrupt entry. The microprocessor 66 reads the digital PES that is applied from the A/D converter 63 to the input of the Servo DSP 64. The microprocessor 66 also reads the track number from the Gray code that is applied to the RD, or digital read input, of the Servo DSP 64. The microprocessor 66 uses this information to form the input measured position value ($x_{1\ meas}$) indicated by block 202 in FIG. 6. Block 203 indicates that the next step is to calculate control signal equations 1 and 2. These equations are given above. The microprocessor 66 executes equation 1 to obtain the estimator error e(k), which is the difference between the measured and the predicted positions. The microprocessor 66 then uses the estimator error e(k) to calculate the control signal u(k) based on equation 2. A part of the control signal $u_{pre\_cal}$ was calculated in the previous sample to minimize the computation delay. The computation delay is defined as the time from the interrupt entry until the control signal is applied to the D/A converter 70. The overall servo gain $k_{gain}$ is used in equation 2 to adaptively compensate for the overall servo gain variation.

The microprocessor 66 then lim-Lits the control signal u(k) with the maximum available power supply to form a limited control signal $u_{dac}(k)$ which is applied to the D/A converter 70, as indicated in block 204. As indicated in block 205, the microprocessor 66 then implements equation 3 to predict position, velocity and bias for the next servo sample. Lastly, in block 206, the microprocessor 66 calculates $u_{per\_cal}$ using equation 4. The microprocessor 66 then performs some housekeeping tasks and waits for the next servo interrupt.

Equation 3 predicts the position, the velocity and the bias for both the linear mode and the saturated mode. The back emf effect is included into the prediction calculation when the limited control signal $u_{dac}$ is near the saturated value. The matrices $\phi$, $\Gamma_1$ and $\Gamma_2$ which are used in equation 3 are functions of the electronic gains and the physical parameters. The physical parameters are the VCM torque constant and the actuator inertia. The matrices $\phi$, $\Gamma_1$ and $\Gamma_2$ are also functions of the sampling time and the calculation delay. The resulting matrices can be calculated using equations given on pages 56–59 of the book Digital Control of Dynamic Systems, 2nd. Ed., Published by Addison-Wesley in 1990, and written by Gene F. Franklin, J. David Powell and Michael L. Workman.

The back emf gain is given in the following equation 6:

$$K_{bemf} = -k_{conv} k_{torque} (\Gamma_1 + \Gamma_2 + \Gamma_3) \quad (6)$$

The back emf gain is derived based on the torque constant, the input matrices, and a unit conversion factor which converts the back emf into the units of the control signal.

Identification Of The VCM Torque Constant

In accordance with the present invention, there is provided an on-line technique for identifying the torque constant of the VCM. This technique involves using an algorithm during calibration to identify the average VCM torque constant.

In the saturated portion of the seek, the control signal is the constant saturated dac value $u_{sat}$, but the VCM acceleration varies with the velocity. The actuator acceleration factor during sample m is given in equation 7, below.

$$\text{Actuator acceleration factor} = \frac{u_{sat} - \frac{k_{conv} k_{torque} (\hat{x}_2(m+1) + \hat{x}_2(m))}{2}}{k_{gain}} \quad (7)$$

The actuator acceleration factor is proportional to the difference between the $u_{sat}$ and the back emf. The continuous velocity during sample m+1 is assumed to be the average velocity between samples m and m+1. $k_{gain}$ is included to take into account the overall gain variation.

Velocity at sample m+1 can be estimated from the velocity at sample m and the actuator acceleration factor during sample m. This is shown in equation 8 below:

$$\hat{x}_2(m+1) = \hat{x}_2(m) + \phi_{23} \text{ Actuator acceleration factor} \quad (8)$$

$\phi_{23}$ is an element given in the matrix $\phi$ which was calculated based on the nominal servo or plant parameters. In the book by Franklin, Powell & Workman, referred to above, the process to be controlled is referred to as the plant. $\phi_{23}$ is the product of the gain factor and the servo sampling time. The torque constant $k_{torque}$ can be derived based on the estimated velocities from samples m to m+n. This is shown in equation 9 below:

$$k_{torque} = \frac{1}{k_{conv}} \frac{nu_{sat} - \frac{k_{gain}(\hat{x}_2(m+n) - \hat{x}_2(m))}{\phi_{23}}}{\frac{\hat{x}_2(m)}{2} + \frac{\hat{x}_2(m+n)}{2} + \sum_{i=m+1}^{m+n-1} \hat{x}_2(i)} \quad (9)$$

In equation 9, $u_{sat}$, $\phi_{23}$ and $k_{conv}$ are the invariable estimator constants which are functions of the physical parameters of the disk file. $k_{gain}$ is a variable which can be obtained using methods disclosed in either U.S. Pat. No. 4,697,127 to Stich et al. or U.S. Pat. No. 4,835,633 to Edel et al. During calibration, the microprocessor 66 stores n+1 samples of the estimator velocities during the saturated portion of the long seek. It then calculates $k_{torque}$ based on those values using equation 9. During calibration, the microprocessor 66 stores n+1 samples of the estimator velocities during the saturated portion of the long seek. It then calculates the torque constant based on those values using equation 9.

The Head Offset Compensation

One of the problems faced in present day small, high-capacity hard disk drives employing precise servo-positioning techniques, is the problem of head offset compensation. The head offset is defined as the position offset between different heads.

As shown in FIG. 1, there are two disks 21, 22 having four recording surfaces 26. Four heads 23 are provided, each of which is associated with a respective disk surface and supported by an associated arm assembly. The heads 23 are attached to a common VCM 24 that serves as an actuator. The heads 23 are all maintained in a fixed relationship with one another relative to their radial position on their respective disk surfaces. When performing a head switch from one disk surface to another in the process of a seek, each head is supposed to be precisely located directly above or below the other.

Heretofore, the typical offset for disk drives has been less than one-half of the track spacing because the track spacing is widely separated, and because the actuator has an integral E-block design. The actuator assembly includes an E-block or comb-like structure having a plurality of arms that hold the heads. Since the earlier design was an integral or monolithic structure, it rigidly supports each head precisely one above the other.

In current designs, the offset for disk drives is much greater than one-half track spacing because the tracks are so much closer together. Currently, the number of tracks per inch has been doubling every two years. The actuator design used in the disk drive digital sector servo of the present invention does not have a unitary or integral E-block. Instead, the so-called E-block of the actuator employed in the disk drive of the present invention contains several discrete, thin head suspensions that resemble shim stock. These discrete shim-like suspensions are aligned during assembly and clamped together, with the VCM 24 being located at the center of rotation of the assembly. Due to the flimsy nature of the assembly, position offsets frequently develop in the head stack during the life of the disk drive.

The offset can be several tracks, rather than one-half track, and can thus significantly degrade access time performance during short seek or head switch modes of operation. For example, a one-track offset can cause one additional millisecond delay for either one track seek, or the head switch time. However, the head offset has little impact on long seeks because the head offset is much less than the distance from the target. By long seek is meant a seek of many hundreds of tracks.

Identification of Head Offset

In accordance with the present invention, there is provided a technique which can be used to identify the offset and then compensate it in the short seek or in the head switch algorithm to preserve the performance. The procedure for identifying the head offset is as follows.

The disk drive is placed in track following mode on head m. Then the disk drive is switched to head n for one sampling time. Sampling time refers to the discrete samples that the microprocessor receives of digital values corresponding to head position error signals. Read the head position value, which includes cylinder number and the PES. During this time, the control signal remains unchanged. That is, the control signal is allowed to be wrong. No attempt is made to correct it. The disk drive is switched back to head m and the servo is operated in the track following mode for several sampling times. The above steps are repeated for k more times. The head offset between head m and head n is calculated using the following equation.

$$\text{Offset}_{mn} = \text{Head\_m\_position} - \frac{1}{k+1}\sum_{i=1}^{k+1} \text{Head\_n\_position}(i) \quad (10)$$

The above sequence is repeated to determine the head offsets for all of the heads.

The Short Seek And Head Switch Algorithm

Typically, short seeks are optimized by adding feed forward into the control signal while the servo is in the track following loop. The feed forward includes acceleration and deceleration pulses. The durations and magnitudes of the pulses are selected using time domain analysis and simulation. They are functions of the track following loop parameters and the seek lengths. If the offset is more than one track in the opposite direction, then the one track seek time is unacceptable, either with or without the feed forward. The optimal short seek performance can be preserved by including the offset into the seeking calculation. The adaptive algorithm that moves the actuator from head m to head n is as follows:

Adjust the estimated position based on the head offset.

$$\hat{x}_1 = \hat{x}_1 + \text{Offset}_{mn} \quad (11)$$

Adjust the seek length.

$$\text{Seek—length} = \text{Seek—length} - \text{Offset}_{mn} \quad (12)$$

Calculate the number of samples in which the acceleration pulse is applied.

$$N_{acceleration} = \text{round}(A_1\text{Seek—length} + B_1) \quad (13)$$

Calculate the number of samples in which the deceleration pulse is applied.

$$N_{deceleration} = \text{round}(A_2\text{Seek—length} + B_2) \quad (14)$$

Calculate the acceleration pulse amplitude.

$$V_{acceleration} = A_3\text{Seek—length}^2 + B_3\text{Seek—length} + C_3 \quad (15)$$

Calculate the deceleration pulse amplitude.

$$V_{deceleration} = A_4\text{Seek—length}^2 + B_4\text{Seek—length} + C_4 \quad (16)$$

Start the seek using the feed forward specified by $N_{acceleration}$, $N_{deceleration}$, $V_{acceleration}$, $V_{deceleration}$.

The A, B, and C coefficients of the polynomials are constants which are functions of the track following loop parameters. They can be determined off line by first calculating the feed forward parameters for a given seek length using the numerical gradient technique and then curve fitting these data as functions of the seek length.

Figure 7:
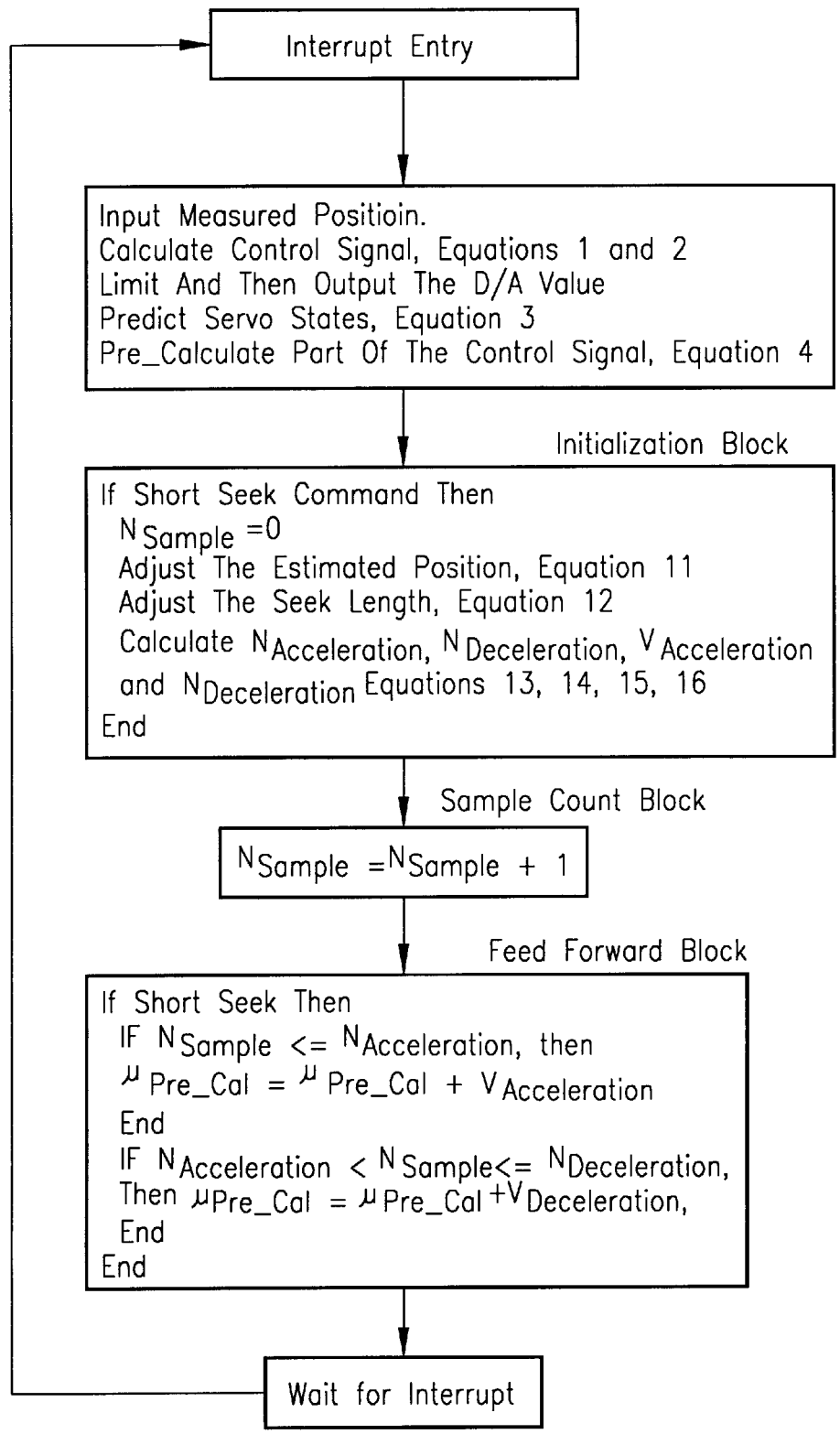
FIG. 7 is a flow chart diagram for a disk file head positioning servo system in accordance with the present invention, and illustrating an adaptive short seek technique.

Referring now to FIG. 7, there is shown a flow chart diagram for a disk file head positioning servo system illustrating an adaptive short seek technique. It is the same as the seek flow chart in FIG. 6 except the feed forward, the sample count and the initialization blocks. During track following the microprocessor continuously checks for a short seek command. If the command is a valid short seek then the initialization block is executed once. It initializes the sample count ($N_{sample}$), adjusts the estimated position and the seek length using equations 11 and 12. It then calculates $N_{acceleration}$ $N_{deceleration}$, $V_{acceleration}$, and $V_{deceleration}$, using equations 13, 14, 15, and 16. The microprocessor increases $N_{sample}$ and then executes the feed forward block. For the first sample after receiving the short seek command, $V_{acceleration}$ is added into the $u_{pre_{cal}}$ to generate the new $u_{pre_{cal}}$ because $N_{sample}$ is less than $N_{acceleration}$. The microprocessor then waits for the next servo interrupt. In the next servo interrupt the microprocessor already knows that it is in the short seek mode. It inputs the measured position, calculates, limits and outputs the control signal to the D/A converter. It then predicts the servo states and calculates part of the control signal $u_{pre_{cal}}$. It increases $N_{sample}$ and executes the feed forward block next. Either $V_{acceleration}$ or $V_{deceleration}$ is added to $u_{per_{cal}}$ depending on the value of $N_{sample}$. For example, $V_{deceleration}$ is used when $N_{sample}$ is between $N_{acceleration}$ and $N_{sample}$. The feed forward block is only executed for the sum of $N_{acceleration}$ and $N_{deceleration}$ samples because the sample count is increased by 1 in every sample.

For head switching without cylinder change, the above algorithm should still be used by setting the unadjusted seek length to zero.

Figure 8:
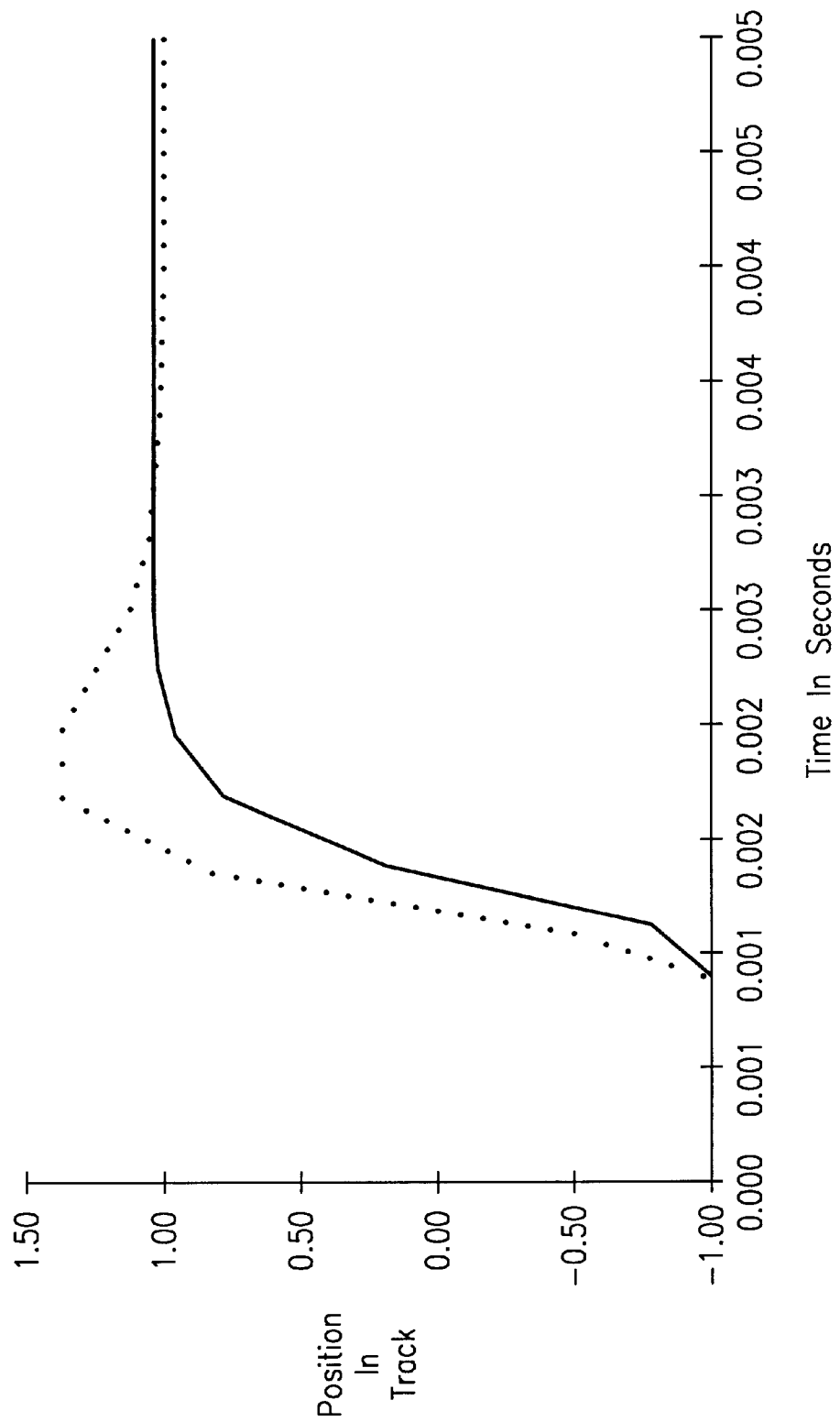
FIG. 8 is a graph showing position in track versus time in seconds to illustrate the improvement in access time when employing the technique of the present invention.

Referring now to FIG. 8, there is shown a graph of position in track versus time in seconds. This figure compares the access times between the prior art servos and the servo of the present invention. The solid line shows the performance of the present invention, and the dotted line shows the performance of the prior art. The access time is the time from the start of the seek until the position is within 16% of the track center for six consecutive samples. For one track offset, the single track access time of the adaptive servo is about 30% better than the prior art servo.

It is to be understood that the above-described embodiment is merely illustrative of some of the many specific embodiments which represent applications of the principles of the present invention. Clearly, numerous variations can be readily devised by those skilled in the art without departing from the scope of the invention

What is claimed is:

1. In a hard disk drive having a plurality of disks, a method of compensating for offset between read/write heads nominally aligned with each other in a head stack positioned by a servo-controlled actuator, said method comprising the following steps:

identifying a short seek command;

initializing servo sample count to zero;

adjusting estimated position of said heads with regard to said disks;

adjusting seek length;

calculating number of servo samples in which an acceleration pulse is applied;

calculating number of servo samples in which a deceleration pulse is applied;

calculating amplitude of acceleration pulses;

calculating amplitude of deceleration pulses;

incrementing servo error count by one; and adding feed forward into said servo-controlled actuator.

2. In a hard disk drive having a plurality of disks, and a plurality of read/write heads nominally aligned with each other in a head stack positioned by a servo-controlled actuator, a method of adaptively adjusting estimator position, feed forward durations and magnitudes based on identified head offsets, said method comprising the following steps:

a adjusting the estimated position based on the head offset $$\hat{x}_1 = \hat{x}_1 + \text{Offset}_{mn}$$

b adjusting the seek length $$\text{Seek\_length} = \text{Seek\_length} - \text{Offset}_{mn}$$

c calculating the number of samples in which the acceleration pulse is applied $$N_{acceleration} = \text{round}(A_1 \text{Seek\_length} + B_1)$$

d calculating the number of samples in which the deceleration pulse is applied $$N_{deceleration} = \text{round}(A_2 \text{Seek\_length} + B_2)$$

e calculating the acceleration pulse amplitude $$V_{acceleration} = A_3 \text{Seek\_length}^2 + B_3 \text{Seek\_length} + C_3$$

f calculating the deceleration pulse amplitude $$V_{deceleration} = A_4 \text{Seek\_length}^2 + B_4 \text{Seek\_length} + C_4$$

g starting the seek using the feed forward specified by $N_{acceleration}$, $N_{deceleration}$, $V_{acceleration}$, and $V_{deceleration}$ where:

$\hat{x}_1$ = estimated position

Offset$_{mn}$ = position offset between head m and head n

Seek_length = seek length $N_{acceleration}$ = the number of samples in which the acceleration pulse is applied round = rounding the expression to integer representation $A_1$ to $A_4$ $B_1$ to $B_4$ = design constants which are selected based on servo loop parameters such as VCM parameters $C_3$ to $C_4$ $V_{acceleration}$ = acceleration pulse amplitude $N_{deceleration}$ = the number of samples in which deceleration pulse is applied $V_{deceleration}$ = deceleration pulse amplitude.

* * * * *